Feb. 6, 1973    L. H. MORSE ET AL    3,714,802
LOCKING BOLTS FOR SHUT-OFF VALVES AND SWITCHES
Filed May 12, 1971      2 Sheets-Sheet 1
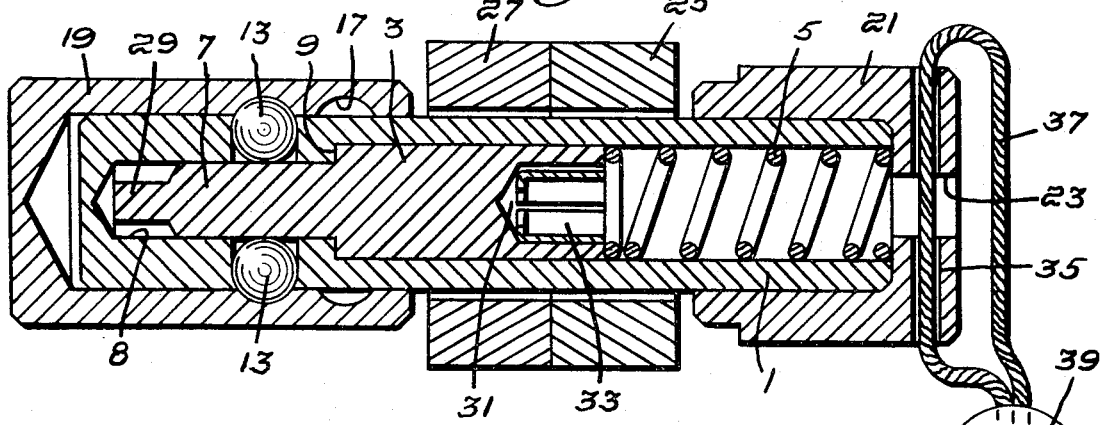
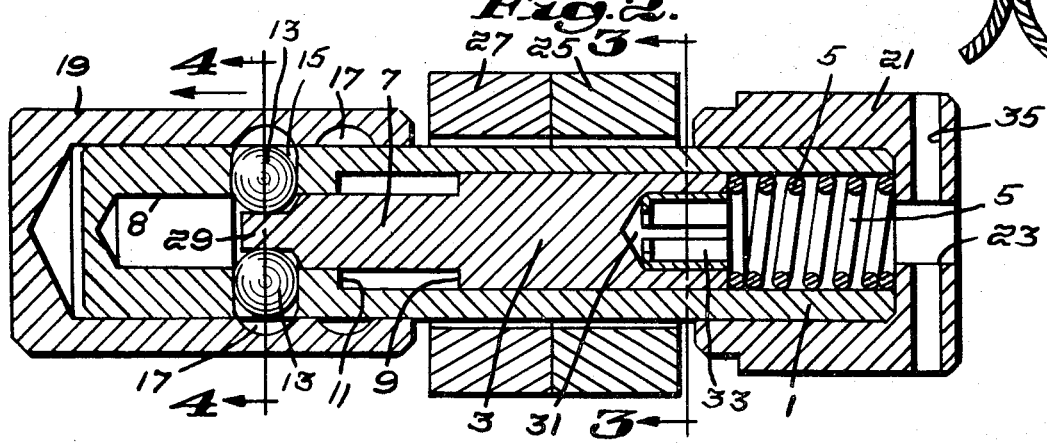
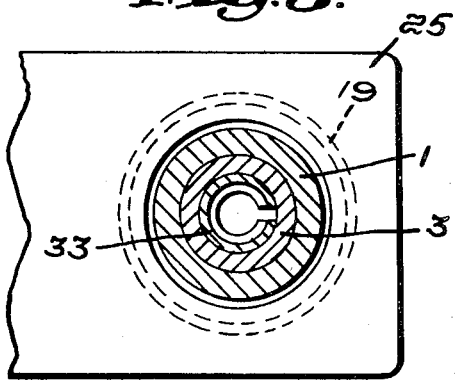
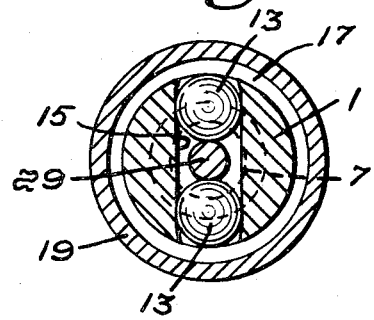
Inventors:
Lynn H. Morse,
Anker J. Nielsen, Jr.
by Robert K. Randall, Attorney

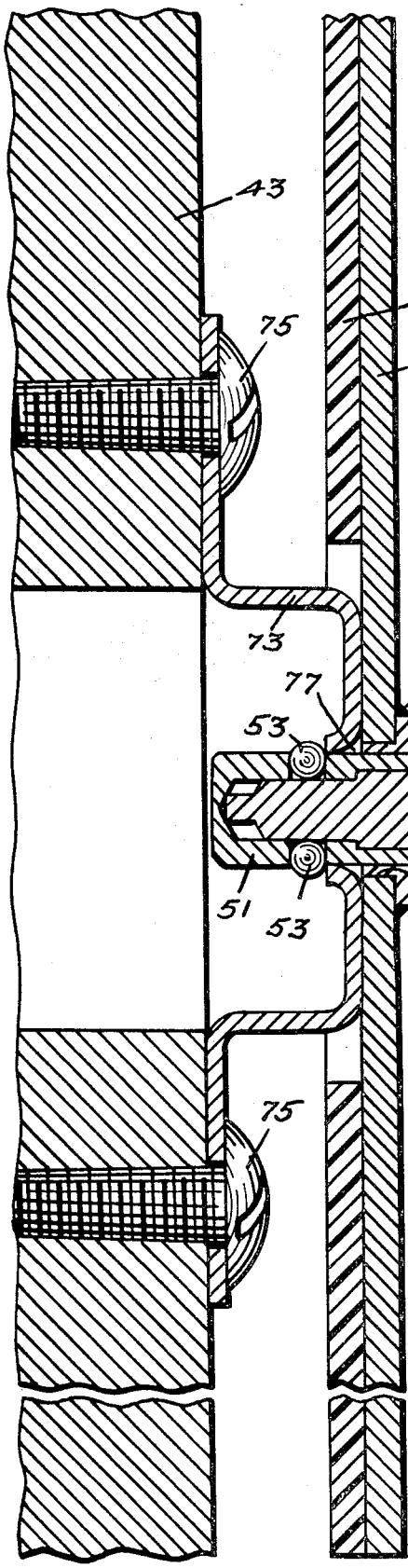
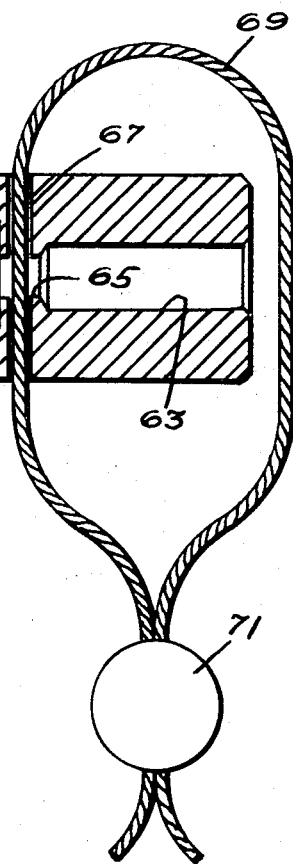
Fig. 5.

3,714,802
LOCKING BOLTS FOR SHUT-OFF VALVES
AND SWITCHES
Lynn H. Morse, P.O. Box 1505, Venice, Fla. 33595, and
Anker J. Nielsen, Jr., 410 Bailey Road, Holden, Mass.
01520
Filed May 12, 1971, Ser. No. 142,462
Int. Cl. E05b 67/36
U.S. Cl. 70—34                                    7 Claims

ABSTRACT OF THE DISCLOSURE

In a locking bolt for shut-off valves, switches, meters, and other supply-controlling devices, such bolt being actuated by an inner spring-biased plunger having an axial recess and accessible only through an aperture in the bolt smaller than the diameter of the recess, the novel provision of a slidable sleeve or liner in such recess which must be expanded into tight frictional engagement with the walls of the recess in order to retract the plunger to unlock the bolt. Sealing means preventing access to the interior of the locking bolt without rupture is provided. The lock is also adapted to fix a cover on a meter casing or other enclosure, to prevent unauthorized access thereto; or to prevent removal of the meter itself.

---

This invention is an improvement in known construction of locks for shut-off valves or switches, aimed to make it practically impossible to open the lock without the proper key, and also to reveal the fact of any unauthorized tampering with the lock.

Locks of the construction shown in Pat. Nos. 1,923,025 to Morse et al. and 3,002,368 to Moberg are so widely used by gas and electric public service companies that resorts to to efforts to pick these locks are occasionally successful on the strength of knowledge or deduction of the manner of operation of the lock. As shown in the patent to Moberg, the only point of attack on the lock, short of destructive violence, is through the narrow aperture at one end which forms the keyhole. The obvious resort has been to introduce a steel wire having on its end a slight short bend and by tilting the wire within the socket in the end of the locking plunger, fortuitiously cause the wire to jam against the walls of the bore hard enough to create the friction necessary to retract the plunger against the resistance of its spring and thus release the locking balls and open the lock.

The manipulation of the lock in both locking and unlocking depends on tight frictional engagement between the walls of this socket in the plunger and the operably distended extremity of the key, of known construction. So, in accordance with the present invention, we provide a tubular element, such as a sleeve, preferably split, in relatively free and slidable relation in the socket in the plunger, to intervene between the walls of the socket and any instrument inserted into it in the effort to pull the plunger, and requiring a degree of radially directed expanding force far greater than that foreseeably attainable by a bent wire lock-picker to spread it into gripping frictional engagement with the walls of the socket. Such requisite force is easily attained by the authorized official key.

A further obstacle to the success of the lock-picker using a bent wire resides in making the socket shallow. Both the toe and the heel of the bend on the end of the lock-picking wire must enter the socket or the sleeve in order to attain the necessary lateral pressure on the socket walls. Hence the offset of the toe from the heel of the pick must exceed the diameter of the socket (or sleeve). But if the socket is shallow, the angle of the bend must be so sharp that the pick will not enter the keyhole which gives the only access to the lock's interior. Thus, we have found that if the depth of the socket does not exceed 1½ times its diameter it is virtually impossible to pick the lock. This stratagem works even in the absence of the sleeve or other adjunct in the socket.

Further to discourage tampering, sealing means for the keyhole is provided, preferably in the form of a pendent type seal whose wire bail extends through a transverse hole intersecting the keyhole and prevents access thereto until ruptured.

Other features of the invention are as set forth hereinafter.

Illustrative embodiments of the invention are shown in the accompanying drawings, in which FIG. 1 is an axial section of the lock in locked relation.

FIG. 2 is a similar view of the same in unlocked relation.

FIGS. 3 and 4 are transverse sections on line 3—3 and 4—4 respectively of FIG. 2.

FIG. 5 shows the improved lock as used to secure the lid of a wattmeter.

Having reference to the drawings, the invention is shown embodied in a lock of the construction shown in Moberg Patent No. 3,002,368, and comprises a tubular body or bolt 1 and a plunger 3 slidable therein and pressed toward the closed end of body 1 by spring 5. One end 7 of plunger 3 is of reduced diameter, an annular shoulder 9 abutting against an internal annular shoulder 11 formed by reducing the bore of body 1 at 8 to fit the end-portion 7, the engagement of these shoulders limiting the extent of movement of plunger 3 as biased by spring 5. In this relation, the end-portion 7 holds two steel balls 13 radially extended for a substantial part of their diameter from the opposite ends of a bore 15 formed diametrically through the walls of the counter-bore 8, and having inwardly swaged ends. Thus extended, they are received in one of annular grooves 17 formed inside a cap 19 fitting freely over the end of body 1, locking the cap removably in place thereon.

The other end of body 1 is closed by a cap 21 press-fitted or otherwise permanently fixed thereon, and having an axial bore 23 forming the keyhole of the lock, as will appear.

In use, the device is employed as a locking bolt, as by putting the body portion 1 through aligned apertures in the fixed arm 25 and movable valve-operating arm 27 of a valve in a pipeline, for example, and then applying the cap 19 to lock the valve in closed relation. As shown in FIG. 2, a further reduced extremity 29 on plunger 3 permits the balls 13 to move radially inward to free the cap 19 and permit its removal and the withdrawal of the lock from the arms 25 and 27, when the plunger is moved away from the closed end of body 1.

As will be seen, the cap 19 can neither be applied nor removed except when the radially extensible locking members, the balls 13, are allowed to move inward, and this requires movement of the plunger 3 towards the fixed cap 21, to the right in FIGS. 1 and 2, against the thrust of spring 5. As in the Mobert patent, this is effected by a key (not shown) having a laterally expandible tip inserted through keyhole 23, through spring 5, and into a socket 31 with cylindrical walls and of a diameter exceeding that of keyhole 23.

In accordance with the present invention, the socket is occupied by a radially expandable resilient cylindrical sleeve 33. In the form shown this sleeve is split longitudinally, has the rim of its inward end turned radially inward to form a shoulder to be engaged by the key, and is freely slidable in socket 31. If desired, its outside diameter as formed may exceed the diameter of the socket 31 by one or two thousandths of an inch, so as to keep it in place in the socket, provided its unaided frictional engagement with the walls of the socket remains insufficient to move the plunger 3. Being substantially equal to the socket in its axial extent, it prevents any tool insertible through keyhole 23 from engaging the plunger 3 directly, and being freely slidable in the socket any axial movement which might be induced by a lock-picking implement of spurious contrivance such as indicated above and incapable of creating a powerful radial thrust will merely pull the sleeve out of the socket leaving the plunger unmoved and the lock undisturbed. However, when the authentic key is used, the sleeve is easily distended into tight frictional engagement with the walls of the socket, retracting the plunger and unlocking the cap 19 as shown in FIG. 2 when the key is moved outward through keyhole 23.

We have found that if the depth of the socket does not exceed 1½ times its diameter it is practically impossible to pick the lock with a wire bent as described, because both the toe and the heel of the bend must enter the socket in order to attain the oppositely directed radial thrusts against the sides of the socket required to get the degree of frictional hold needed to pull the plunger; but with the ratio of the socket's dimensions made as just specified the bend would have to be made so sharp that it would not pass through the keyhole 23 when the latter is made less in diameter than that of the socket. The same ratio between the interior dimension of the split sleeve and the size of the keyhole may be followed if desired, to add further safeguard.

As an added deterrent to tampering, a transverse bore 35 intersecting the keyhole 23 is provided for the reception of the wire 37 of a seal 39. Thus no key or other operable tool can be inserted through the keyhole without previous rupture of the sealing wire.

FIG. 5 shows the application of the improved lock to prevent access to the terminal contacts of the service and working circuits inside the conventional electric wattmeter when the latter is removed to suspend the delivery of electric current, as for non-payment of charges for such service. To prevent the bridging of the terminals as a resort to defeat the intended withholding of service, access to the terminals is prevented by a circular metal shield or cover 41 closely fitting the interior diameter of the usual cup-shaped meter housing, case or base partly indicated at 43, backed by an insulating ring of dielectric material 45 of suitable plastic protecting the shield from contact with the terminals on the back wall of the housing 43.

The shield is detachably fixed to the case 43 by a modified form of the lock already described, and comprises a head 46 fixed in a central hole 47 in the shield as by weld 49. In this head is permanently fixed a tubular body 51 having a pair of bolting balls 53 disposed as in FIG. 4 and held in extended relation by a slidable plunger 57 formed and operating as already described in regard to the form of FIGS. 1 to 4, the same type of split sleeve 59 and expanding coil spring 61 being used and working as described. The keyhole 63 is constricted at 65 to less than the inside diameter of the sleeve 59 and intersected at this location by the diametrical bore 67 for the wire 69 of lead seal 71.

To lock the shield and its parts in place in the meter case, a hasp 73, conveniently made of a metal strap offset at mid-length and bolted to the case 43 by screws 75, is formed with a hole 77 broached therein to receive the free end of body 51. The spaced relation of the balls 53 from the proximate face of shield 41 is such that the balls will assume their outwardly extended relation and block withdrawal of body 51 and release of the shield and its parts, so long as the portion of plunger 57 of median diameter stands in its normal position between the balls, as shown in FIGS. 1 and 5.

As hereinbefore, the plunger 57 is retracted to let the balls retreat within the diameter of the body 51, by use of the proper key, in locking or unlocking the shield. As before set forth, the split sleeve prevents a picking instrument of the described type from attaining sufficient frictional grip on the plunger to retract it. The narrow throat 65 of the keyhole limits the shape and diameter of the picking tool to inoperative capacity. The bevel of the rim of hole 77 in the hasp 73 guides the body 51 into the hole in the hasp and cams the balls radially inwardly of the body 51, facilitating the entry of the body into the hasp.

The hasp is permanently fixed in the case 43, and does not interfere with the overlying meter base when the meter is in place.

It will be seen that the invention may easily be adapted to the locking of switch boxes, fuse boxes, and the housings of other service and supply controls.

It is also suited for use to prevent removal of the customary C-shaped clamp whose U-section embraces the co-engaging flanges of the meter and its housing. The novel lock is inserted through aligned holes in the radially extending terminal lugs of the clamp in place of the usual bolt, to prevent opening the clamp for release and removal of the meter.

While we have illustrated and described certain forms in which the invention may be embodied, we are aware that many modifications may be made therein by any person skilled in the art, without departing from the scope of the invention as expressed in the claims. Therefore we do not wish to be limited to the particular forms shown, or to the details of construction thereof, but What we do claim is:

1. A lock having a tubular body having an axial bore, radially extendible locking members thereon, a spring-biased plunger therein actuating such members, and means confined within the body and relatively movable within the plunger expandible radially into frictional gripping engagement with the plunger so as to retract the plunger by use of expanding means introduced through the end of the bore of the body.

2. The combination according to claim 1 in which the bore of the body is of reduced diameter at one end and obstructed at the other end.

3. The combination according to claim 1 in which the means relatively movable within the plunger comprises a split sleeve axially slidable therein.

4. The combination according to claim 3 in which the plunger has a socket receiving the split sleeve, the depth of which socket is less than 1½ times its diameter.

5. The combination according to claim 2 in which a transverse bore intersects the bore of the body at its reduced diameter and serves for the introduction of sealing means.

6. The combination according to claim 3 in which the sleeve has an inturned rim.

7. Closure means for meter cases and other containers having an apertured member fixed therein, a shield for barring access to the case, and locking means comprising a tubular body fixed on the shield, radially extendible locking members on the body adapted to prevent passage of the body through the apertured member, a spring-biased plunger retained therein and in the body actuating such locking members, and means relatively movable within the plunger expandible radially into frictional gripping engagement with the plunger so as to retract the plunger by use of expanding means introduced through the end of the body, whereby the locking members assume positions within the diameter of the body permitting the latter to pass through the aperture in the member fixed in the case.

References Cited

UNITED STATES PATENTS

| 3,002,368 | 10/1961 | Moberg | 70—14 |
| 3,572,063 | 3/1971 | Foote | 70—50 |

JOSEPH H. McGLYNN, Primary Examiner

U.S. Cl. X.R.

70—50